M. H. LOCKWOOD AND H. NIAS.
DISPENSING MACHINE.
APPLICATION FILED SEPT. 23, 1916.
1,311,170.
Patented July 29, 1919.
2 SHEETS—SHEET 1.
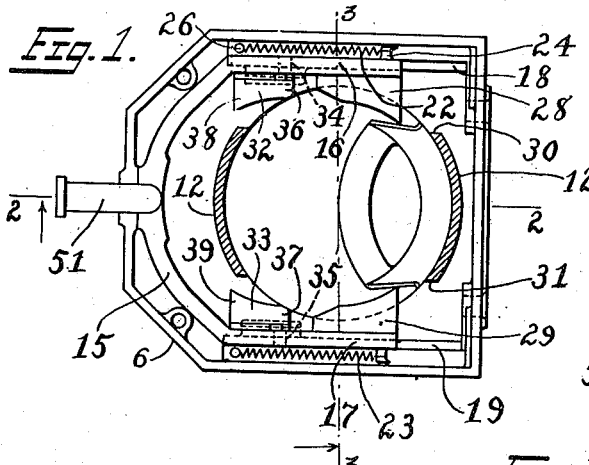
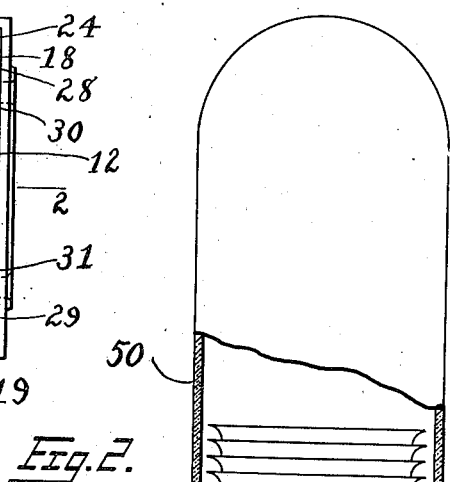
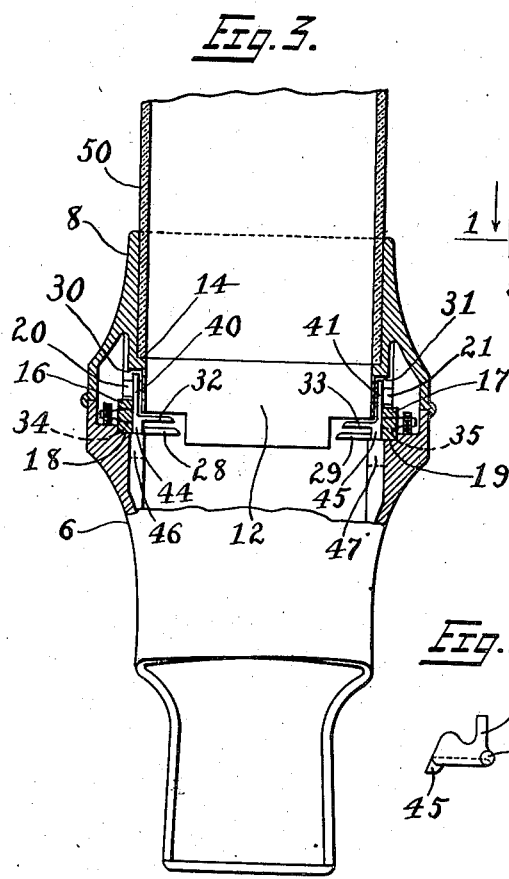
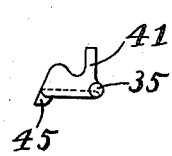
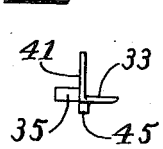
Inventors:
Marquis H. Lockwood
and Henry Nias
by Wilbur M. Stone
their Attorney.

M. H. LOCKWOOD AND H. NIAS.
DISPENSING MACHINE.
APPLICATION FILED SEPT. 23, 1916.
1,311,170.
Patented July 29, 1919.
2 SHEETS—SHEET 2.
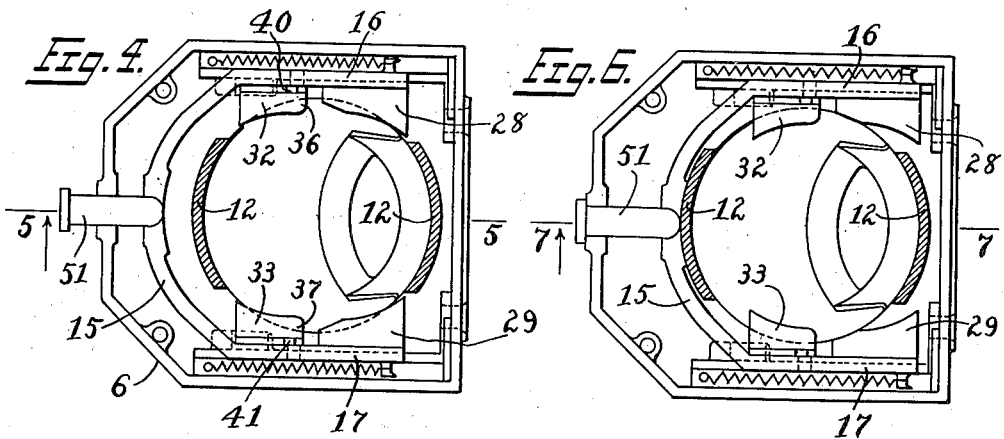
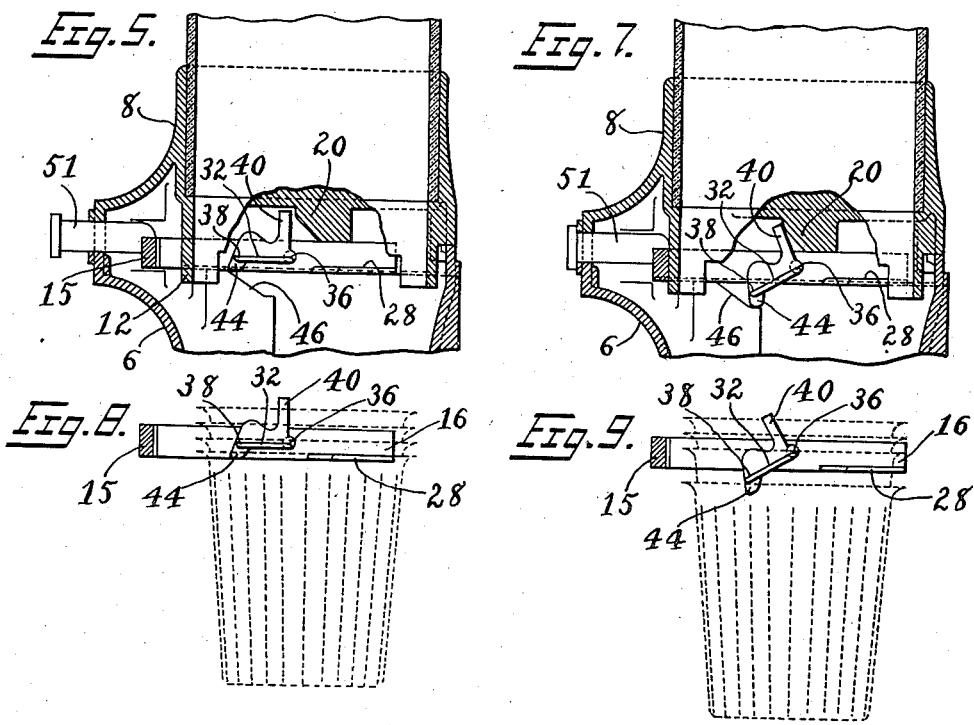
Inventors:
Marquis H. Lockwood
and Henry Nias
by Wilbur M. Stone
their Attorney.

UNITED STATES PATENT OFFICE.

MARQUIS H. LOCKWOOD, OF NEW YORK, AND HENRY NIAS, OF BROOKLYN, NEW YORK, ASSIGNORS TO PUBLIC SERVICE CUP COMPANY, OF BROOKLYN, NEW YORK, A CORPORATION OF NEW YORK.

DISPENSING-MACHINE.

1,311,170.           Specification of Letters Patent.     Patented July 29, 1919.

Application filed September 23, 1916. Serial No. 121,717.

*To all whom it may concern:*

Be it known that we, MARQUIS H. LOCKWOOD, a citizen of the United States, and a resident of New York, borough of Manhattan, in the county of New York and State of New York, and HENRY NIAS, a citizen of the United States, and a resident of New York, borough of Brooklyn, in the county of Kings and State of New York, have jointly invented certain new and useful Improvements in Dispensing-Machines, of which the following is a specification.

This invention relates to dispensing machines and particularly to that class thereof which is provided for dispensing nested flanged articles such as paper drinking cups. The object of our improvements is to provide a machine of the class specified, of simple construction, and comprising few parts having a minimum liability to derangement. With these objects in view our improved dispensing machine comprises features illustrated in their preferred embodiment in the drawings accompanying this specification, wherein—

Figure 1 is a sectional plan view taken on line 1—1 of Fig. 2. Fig. 2 is a sectional elevation taken on line 2—2 of Fig. 1. Fig. 3 is an elevation partly in section on line 3—3 of Fig. 1 but showing the primary supports and separator-supports in full. Fig. 4 is a sectional plan view similar to that of Fig. 1, but with the movable parts at about the middle of their stroke. Fig. 5 is a sectional elevation on line 5—5 of Fig. 4, the positions of the movable parts corresponding respectively with their positions in Fig. 4. Fig. 6 is a sectional plan view similar to the views of Figs. 1 and 4 but with the movable parts at the closing end of their stroke. Fig. 7 is a sectional elevation on line 7—7 of Fig. 6, the positions of the movable parts corresponding respectively with their positions in Fig. 6. Fig. 8 is a fragmentary elevation illustrating the action of the cup engaging members, corresponding with the positions of those members in Figs. 4 and 5. Fig. 9 is a fragmentary elevation, similar to that of Fig. 8 and illustrating the action of the cup engaging members, corresponding with the positions of those members in Figs. 6 and 7. Figs. 10 and 11 are an end elevation and a side elevation respectively, of one of the cup engaging separator-supports. All the views are to one scale.

The housing for our improved dispensing machine preferably consists of two members, base 6 and cap 8, joined along line 1—1, Fig. 2, and held together at the back by hooks as 9 of cap 8 interlocking with ears as 10 of base 6. At the front the two members 6 and 8 are held together by screws as 11, passing through holes in base 6 and threaded into cap 8. The inside portion 12 of cap 8 is of tubular formation and serves as a guide for the stack of nested cups 13. Said tube 12 is enlarged at its upper end and is provided about midway its length with an annular shoulder 14 for the support of tubular stack container 50, preferably of glass.

Mounted for movement transversely of the stack of cups in said housing is slide 15. Said slide is preferably of U shaped formation having opposite arms or side members 16, 17, uniting at the front portion in means for actuating the slide consisting of a push rod handle 51, which protrudes through the housing at the parting line between base 6 and cap 8. Said arms 16, 17 slide in bearings 18, 19 respectively in base 6 and are held therein by cap members 20, 21.

The lower end of tubular portion 12 of cap 8 is cut away at each side thereof at 30, 31 to provide room for the passage of arms 16, 17 of slide 15, and of members carried thereon.

For returning said slide 15 to its outward position, Figs. 1 and 2, after having been pushed inwardly for releasing a cup, Figs. 4 to 9 inclusive, we provide opposite pull springs 22, 23. Referring particularly to spring 22, one end thereof is attached to horn 24 of arm 16 and the other end to post 26 of base 6. The other spring 23 is similarly mounted on the other side of slide 15.

Carried by, and preferably formed integral with arms 16, 17 of slide 15, are a pair of primary supports 28, 29 respectively. These primary supports are of shelf-like conformation, reaching crosswise the machine toward each other, and having their inner edges curved inwardly toward the rear in conformity with the circular cross section of the cups.

Positioned outwardly from said primary supports, toward the handle end of slide 15, a pair of oppositely disposed separator-supports 32, 33 are carried by arms 16, 17 respectively, of said slide 15. Said separator-supports are preferably pivotally mounted at 34, 35 in said arms 16, 17 respectively, and preferably the pivots are at or near the inner ends 36, 37 respectively, of said separator-supports, so that, when said supports are swung on their pivots those inner ends will not be raised materially from the positions they occupy when said supports are in their normal retracted positions in parallelism with the cup flanges, Figs. 1 and 2. Said separator-supports are preferably of less thickness than the space between adjacent cup flanges and have their outward ends turned toward each other, crosswise the machine, first, so that they may enter freely between the flanges of adjacent cups, and second, so that they may lap around the cup body to provide a larger field of engagement with the cup flange therebelow. Also the inner ends 36, 37 of said separator-supports are spaced apart from the outer ends respectively of their corresponding primary supports 28, 29. For swinging downwardly, at proper times, the outer ends 38, 39 of said separator-supports we provide on each thereof an upstanding arm, as 40 to separator-support 32, for engagement with the cam face of cap member 20.

For returning said separator-supports to their normal positions respectively in parallelism with the cup flanges we provide on each of said separator-supports a down-reaching arm, as arm 44 to separator-support 32, for engagement with cam-member 46 fixed to base 6 of the housing.

Primary supports 28, 29 are efficient, when slide 15 is in its outward position, Figs. 1 and 2, for supporting the lowermost cup of the stack by engagement with the underside of the flange thereof. Said separator-supports 32, 33 are efficient during the earlier part of the inward stroke of slide 15 for supporting the cup next to the lowermost cup and later, while still maintaining their supporting engagement with the next to the lowermost cup, for separating the lowermost cup from the cup next thereabove.

The operation of our improved dispensing machine is as follows: The several operative parts of the machine being in their normal or retracted positions, the machine is supplied with a stack of nested flanged cups, preferably mouth upward, all as shown in Figs. 1 and 2; primary supports 28, 29 being in supporting engagement with the lowermost cup of the stack and separator-supports 32, 33 being in their idle positions respectively.

Handle 51 and slide 15 are then pushed inwardly, to the right in Figs. 1 and 2, thereby causing primary supports 28, 29 to move inwardly out of supporting engagement with the lowermost cup, through the positions of Figs. 4 and 5 to the positions of Figs. 6 and 7. During this inward movement of the slide that lowermost cup falls by gravity without the assistance of separator-supports 32, 33 and before that cup is released by primary supports 28, 29, said separator-supports 32, 33 enter between the flanges of the lowermost cup and the cup next thereabove and into supporting engagement with the flange of that next to the lowermost cup, Figs. 4 and 5. While said slide 15 moves from the position of Figs. 4 and 5 to that of Figs. 6 and 7, primary supports 28, 29 are withdrawn entirely from supporting engagement with the lowermost cup and that cup falls as described. During this movement upstanding arms 40, 41 of separator-supports 32, 33 engage fixed cams 20, 21 respectively, whereby the outward ends 38, 39 of said separator-supports are swung downwardly and if said lowermost cup adheres to the cup next thereabove and refuses to fall, those outer ends 38, 39 engage the upper face of the flange of the lowermost cup and forcibly separate that cup from the cup next thereabove, Figs. 6, 7 and 9. During this operation of swinging downwardly outward ends 38, 39 of said separator-supports, inward ends 36, 37 thereof remain in supporting engagement with the cup next above the lowermost cup.

Handle 51 being now released, springs 22, 23 return slide 15 to its normal outward position, Figs. 1 and 2, and arms 44, 45 engage cams 46, 47 respectively, swinging said separator-supports on their pivots to their normal positions relatively to said slide and in parallelism with the cup flanges. Also by the return movement of slide 15 primary supports 28, 29 are again brought into supporting relation to what is now the lowermost cup of the stack.

We claim:

1. In a machine for dispensing flanged cups from a nested stack the combination of a slide, and blades thereon for alternately supporting the lowermost cup and the next to the lowermost cup of the stack, one of said blades being pivotally mounted and rotatable to separate the lowermost cup while supporting the next to the lowermost cup.

2. In a machine for dispensing flanged cups from a nested stack, the combination of a slide operable transversely of said stack, a blade pivotally mounted on said slide for supporting the next to the lowermost cup of the stack, and means for rotating said pivotally mounted blade to separate the lowermost cup while supporting the next to the lowermost cup.

3. In a machine for dispensing flanged cups from a nested stack, the combination of a slide operable transversely of said stack, a blade fixed to said slide for at one time supporting the lowermost cup of the stack and a blade pivotally mounted on said slide for at another time supporting the next to the lowermost cup of the stack, and means for rotating said pivotally mounted blade to separate the lowermost cup while supporting the next to the lowermost cup.

4. A dispensing machine for flanged cups including in combination a housing, a guide on said housing for a stack of nested flanged cups, a slide mounted for movement in said housing transversely of said stack, a pair of oppositely disposed primary supports carried by said slide and movable into and out of supporting engagement with the lowermost cup of the stack, a pair of oppositely disposed separator-supports pivotally mounted on said slide and movable into and out of supporting engagement with the next to the lowermost cup of the stack, the inward movement of said slide being effective for causing the primary supports to withdraw from engagement with the lowermost cup after the separator-supports have passed into supporting engagement with the cup next above said lowermost cup, means operable during the inward movement of said slide for swinging said separator-supports on their pivots respectively for separating said lowermost cup from the cup next thereabove while said separator-supports are maintained in supporting engagement with that cup next above the lowermost cup, means operable during the outward movement of the slide for returning said separator-supports to their normal positions respectively, relatively to said slide, and means for actuating the slide.

5. A dispensing machine for flanged cups including in combination a housing, a guide on said housing for a stack of nested flanged cups, a slide mounted for movement in said housing transversely of said stack, a pair of oppositely disposed primary supports carried by said slide and movable into and out of supporting engagement with the lowermost cup of the stack, a pair of oppositely disposed separator-supports pivotally mounted on said slide near one end of said separator-supports respectively and movable into and out of supporting engagement with the next to the lowermost cup of the stack, the inward movement of said slide being effective for causing the primary supports to withdraw from engagement with the lowermost cup after the separator-supports have passed into supporting engagement with the cup next above said lowermost cup, means operable during the inward movement of said slide for swinging downwardly one end of said separator-supports for engagement with the flange of the lowermost cup for separating that cup from the cup next thereabove while the other ends of said separator-supports are maintained in supporting engagement with that cup next above the lowermost cup, means operable during the outward movement of the slide for returning said separator-supports to their normal positions respectively, relatively to said slide, and means for actuating the slide.

6. A dispensing machine for flanged cups including in combination a housing, a guide on said housing for a stack of nested flanged cups, a slide mounted for movement in said housing transversely of said stack, a pair of oppositely disposed primary supports carried by said slide and movable into and out of supporting engagement with the lowermost cup of the stack, a pair of oppositely disposed separator-supports pivotally mounted on said slide near one end of said separator-supports respectively and movable into and out of supporting engagement with the next to the lowermost cup of the stack, the inward movement of said slide being effective for causing the primary supports to withdraw from engagement with the lowermost cup after the separator-supports have passed into supporting engagement with the cup next above said lowermost cup, an arm on each of said separator-supports, oppositely disposed members carried by said housing for engaging said arms respectively during the inward movement of the slide for swinging downwardly one end of said separator-supports for engagement with the flange of the lowermost cup for separating that cup from the cup next thereabove while the other ends of said separator-supports are maintained in supporting engagement with that cup next above the lowermost cup, means operable during the outward movement of the slide for returning said separator-supports to their normal positions respectively, relatively to said slide, and means for actuating the slide.

7. A dispensing machine for flanged cups including in combination a housing, a guide on said housing for a stack of nested flanged cups, a U-shaped slide mounted for movement in said housing transversely of said stack, a pair of primary supports carried by the opposite arms respectively of said U-shaped slide and movable into and out of supporting engagement with the flange of the lowermost cup of the stack, a pair of separator supports pivotally mounted on the opposite arms respectively of said U-shaped slide near one end of said separator-supports respectively and movable into and out of supporting engagement with the next to the lowermost cup of the stack, the inward movement of said slide being effective for causing the primary supports to withdraw from engagement with the lowermost cup after the separator-supports have passed into supporting engagement with the cup next above said lowermost cup, an arm on each of said separator-supports, oppositely disposed members carried by said housing for engaging said arms respectively during the inward movement of the slide for swinging downwardly one end of said separator-supports for engagement with the flange of the lowermost cup for separating that cup from the cup next thereabove while the other ends of said separator-supports are maintained in supporting engagement with that cup next above the lowermost cup, means operable during the outward movement of the slide for returning said separator-supports to their normal positions respectively, relatively to said slide, and means for actuating the slide.

8. A dispensing machine for flanged cups including in combination a housing, a guide on said housing for a stack of nested flanged cups, a slide mounted for movement in said housing transversely of said stack, a pair of oppositely disposed primary supports carried by said slide and movable into and out of supporting engagement with the lowermost cup of the stack, a pair of oppositely disposed separator-supports of less thickness than the space between adjacent cup flanges, pivotally mounted on said slide and lying normally in parallelism with said cup flanges and adapted, upon the inward movement of said slide, to enter freely between the flange of the lowermost cup and that of the cup next thereabove, the inward movement of said slide being effective to cause the primary supports to withdraw from engagement with the lowermost cup after the separator-supports have passed into supporting engagement with the cup next above said lowermost cup, means operable after said separator-supports have entered between said cup flanges for swinging downwardly one end of said separator-supports for separating the lowermost cup from the one next thereabove, the other ends respectively of said separator-supports being maintained in supporting engagement with said cup next above the lowermost cup, means operable during the outward movement of the slide for returning said separator-supports to their normal positions respectively, relatively to said slide, and means for actuating the slide.

9. A dispensing machine for flanged cups including in combination a housing, a guide on said housing for a stack of nested flanged cups, a slide mounted for movement in said housing transversely of said stack, a pair of oppositely disposed primary supports carried by said slide and movable into and out of supporting engagement with the lowermost cup of the stack, a pair of oppositely disposed separator-supports pivotally mounted on said slide near one end of said separator-supports respectively and movable into and out of supporting engagement with the next to the lowermost cup of the stack, the inward movement of said slide being effective for causing the primary supports to withdraw from engagement with the lowermost cup after the separator-supports have passed into supporting engagement with the cup next above said lowermost cup, means operable during the inward movement of said slide for swinging said separator-supports on their pivots respectively for separating said lowermost cup from the cup next thereabove while said separator-supports are maintained in supporting relation to that cup next above the lowermost cup, means operable during the outward movement of the slide for returning said separator-supports to their normal positions respectively, relatively to said slide, and means for actuating the slide.

10. A dispensing machine for flanged cups including in combination a housing, a guide on said housing for a stack of nested flanged cups, a U-shaped slide mounted for movement in said housing transversely of said stack, a pair of primary supports carried by the opposite arms respectively of said U-shaped slide and movable into and out of supporting engagement with the flange of the lowermost cup of the stack, a pair of oppositely disposed separator-supports pivotally mounted on said slide near one end of said separator-supports respectively and movable into and out of supporting engagement with the next to the lowermost cup of the stack, the inward movement of said slide being effective for causing the primary supports to withdraw from engagement with the lowermost cup after the separator-supports have passed into supporting engagement with the cup next above said lowermost cup, an arm on each of said separator-supports, oppositely disposed members carried by said housing for engaging said arms respectively during the inward movement of the slide, means operable during the outward movement of the slide for returning said separator-supports to their normal positions respectively relatively to said slide, and means for actuating the slide.

11. In a machine for dispensing flanged cups from a vertically disposed nested stack the combination of a pair of primary supports movable into and out of supporting engagement with the lowermost cup, and a pair of secondary supports movable into and out of supporting engagement with the next to the lowermost cup, said secondary supports being angularly movable respectively, after entering between adjacent cup flanges and relatively to the planes thereof, while remaining in supporting engagement with the cup next thereabove.

12. In a machine for dispensing flanged cups from a vertically disposed nested stack the combination of a pair of primary supports movable into and out of supporting engagement with the lowermost cup, and a pair of secondary supports movable into and out of supporting engagement with the next to the lowermost cup, said secondary supports being angularly movable respectively, after entering between adjacent cup flanges and relatively to the planes thereof, while remaining in supporting engagement with the cup next thereabove, whereby the lowermost cup upon undue adherence to the cup next thereabove will be forcibly separated therefrom.

13. In a machine for dispensing flanged cups from a nested stack the combination of a member movable into and out of the space between adjacent cup flanges and in parallelism with said flanges, said member being adapted for angular movement relatively to and when between said flanges, whereby while one portion of said member engages one flange another portion of said member will engage the other flange for separating said flanges, means for moving said member into and out of said space, and means for causing said member to engage said flanges as described.

14. In a machine for dispensing flanged cups from a nested stack the combination of a member movable into and out of the space between adjacent cup flanges and in parallelism with said flanges, said member being adapted for angular movement relatively to said flanges during its movement inwardly therebetween, whereby while one portion of said member engages one flange another portion of said member will engage the other flange for separating said flanges, means for moving said member into and out of said space, and means for causing said member to engage said flanges as described.

15. In a machine for dispensing flanged cups from a nested stack the combination of a pivotally mounted member movable into and out of the space between adjacent cup flanges, said member being free to move on its pivot only when between said flanges, whereby while one portion of said member engages one flange another portion of said member will engage the other flange for separating said flanges, means for moving said member into and out of said space, and means for rocking said member on its pivot to engage said flanges as described.

Signed at New York, N. Y., this 22 day of September, 1916.

MARQUIS H. LOCKWOOD.
HENRY NIAS.